United States Patent [19]
Faulk

[11] Patent Number: 5,945,806
[45] Date of Patent: Aug. 31, 1999

[54] VARIABLE-VOLTAGE PROGRAMMABLE BATTERY MODULE

[75] Inventor: Richard A. Faulk, Cypress, Tex.

[73] Assignee: Compaq Computer Corporation, Houston, Tex.

[21] Appl. No.: 08/921,306

[22] Filed: Aug. 29, 1997

[51] Int. Cl.[6] .......................... H01M 10/44; H01M 10/46
[52] U.S. Cl. ............................................................. 320/127
[58] Field of Search ................................. 320/106, 110, 320/112, 125, 127, 132, 136, 140, 160, FOR 101, FOR 104, FOR 118, FOR 138

[56] References Cited

U.S. PATENT DOCUMENTS 5,565,759  10/1996  Dunstan ................................. 320/135
5,629,604   5/1997  Sengupta et al. ..................... 320/145
5,734,254   3/1998  Stephens ............................... 320/106

OTHER PUBLICATIONS

"DS2435 Battery ID Chip", product announcement, Dallas Semiconductor. no date.
"The L6901 Smart Battery Charger IC", product announcement, SGS–Thomson Microelectronics, Inc.. no date.
"One Chip Solution for Smart Battery Charger, the U24XX", product announcement, TEMIC. no date.

*Primary Examiner*—Edward H. Tso
*Attorney, Agent, or Firm*—Robert Groover

[57] ABSTRACT

A battery pack which contains an integral bidirectional up/down voltage converter, so that the voltage of the battery does not have to match the voltage of the system power lines at all. Thus a single battery pack can be used in different systems which have different power bus voltages.

24 Claims, 3 Drawing Sheets

VARIABLE-VOLTAGE PROGRAMMABLE BATTERY MODULE

BACKGROUND AND SUMMARY OF THE INVENTION

The present invention relates to voltage-converting battery modules, and to portable systems which include them.

Background: Battery Management

Currently the custom solutions to applications of rechargeable energy services are costly and inflexible. Chargers must be custom designed and cannot be interchanged. Batteries are unique for each application and have very unique charge and discharge characteristics. Complex algorithms are often used for charge/discharge control.

Recently some efforts have been made to standardize batteries, but they still require custom, highly specialized interface electronics. (Examples include the DuraCell PowerSmart™ battery models DR35 and DR121, Motorola battery models EP3656, and Molicell model ME202.) Even the "standards" that are being proposed are too unique and specialized, and require highly specialized interface electronics.

Background: Smart Battery Modules

In the 1990s some battery modules have included logic chips (either microcontrollers or programmed custom logic chips). These chips are used for charge/discharge control, communications, and related functions such as overtemperature and overcurrent monitoring, or for a "gas gauge" function which estimates battery life.

Background: Converting Battery Modules

A further development was introduced in the Fall of 1996 (less than one year before the effective filing date of the present application), when Compaq Computer Corporation shipped a battery module which included an integral DC-DC switching converter. The DC-DC converter provided precise regulation of the charging voltage applied to lithium-ion battery cells, and hence permitted lithium-ion compatibility to be retrofitted into a system which was not originally designed for it. (Specifically, this battery module was used with a system where the voltage regulation from the AC adapter was not precise enough to be a safe supply for charging lithium-ion batteries.)

Universal Battery Module

The present invention provides a new battery pack architecture which contains several new concepts. This battery pack contains an integral converter, so that the voltage of the battery cells does not have to match the voltage of the system power lines at all. In the presently preferred embodiment, the converter is bidirectional, and can increase or decrease the voltage in either direction.

If conventional power bus voltages and battery cell configurations are used, the integral converter can be operated as a buck converter when the battery is charging (to efficiently change the system voltage to match the battery's preferred charging voltage), and as a boost converter when the battery is discharging, to increase the battery voltage to the exact value required by the system. However, the battery voltage does not have to be less than the system voltage, but can alternatively be greater (if the converter is programmed to achieve this). Moreover, the voltage conversion ratios do not have to be constant. Thus, the charge and discharge curves can be fully optimized for the exact characteristics of the particular battery being used. This permits greater efficiency of energy extraction from a given battery, and this in turn translates to greater energy density in the battery. This is one of the key goals of battery development for portable computers.

This architecture provides many advantages, including at least the following:

Complete and simple programmability of battery charge and discharge voltage curves. This permits total optimization of the battery's energy storage and lifetime.

The universal battery module can charge from a very wide range of sources, and has no special requirements for the charging source at all.

The universal battery module preferably provides automatic and simple conversion between discharge and charge mode.

The universal battery module is chemistry independent. The system does not need to know the detailed optimization of each new battery technology introduced, and hence battery technology can be updated as fast as practical.

A particular advantage of this power architecture is that the system can use a really poor quality AC adapter, since the converting battery module is more tolerant of voltage irregularities on the system power bus. Moreover, the converting battery module can even compensate for short drop-outs in the power-line voltage during AC operation. For example, when a nearby motor starts up, the voltage at an AC power line outlet might drop, for example, from 115 V to 100 V for a few hundred milliseconds. With such a sag in power-line voltage, the DC output from a low-quality AC adapter might drop, for example, from 40 volts to 35 volts (or less). However, if a fully-charged converting battery module is present on the computer's power bus, and has its voltage regulation setpoint at 39 V, then the battery module will keep the system power voltage from falling below 39 V during the power glitch (without any switching or delay for decisionmaking). This adds stability to the system operation. (Similarly, the same battery module can be used to perform the same function in another system which has a different bus voltage.)

A converting battery module means that a detachable battery module has the capability to provide power directly into a system bus. This permits the electronics on the system side to be simplified. Moreover, a single battery module can be used on systems with different voltage requirements (as long as the output voltage is appropriately programmed).

A particular advantage of the systems which include a converting battery module is that the circuitry on the system side can be simplified. The battery module itself can be made quite indifferent to voltage fluctuations on the system power bus, so that the specifications on the AC adapter can be anything which is acceptable to the devices which operate in the system. Moreover, charge can also be drawn from other sources, such as a telephone wall jack or a car battery.

A smart battery module typically includes a microcontroller, and some form of digital communication is preferably provided between the battery module's microcontroller and control components on the system side. However, an advantage of the universal battery module is that it can be used for simpler electronic systems, as well as for powering computers. Thus, manufacturers may wish to bring out simple components, such as a portable game machine, portable audio playback device, camcorder, flashlight, radio-controlled toy, or power tool, which is powered by the same high-end batteries which are used to power computers or high-end telecommunications equipment. The universal battery module described in the present application can power this wide variety of equipment, even if their power requirements are widely different.

As noted above, the use of an integral bidirectional up/down converter in the battery module permits the battery voltage to be higher than the system voltage. In one notable class of embodiments, the voltage across the electrochemical cells is intentionally made higher than the system power embodiments. This is particularly advantageous with chemistries which operate most efficiently at relatively low current. This also permits the individual battery cells to be electrically connected in a purely series configuration, rather than the series-parallel configurations which are more common. A pure series configuration guarantees that all cells will have transferred equal amounts of charge, whereas parallel or series-parallel configurations do not guarantee this. With standard cells, this embodiment permits designers to pick a convenient standard cell size, pick a number of cells to achieve the required power and energy, and then combine them in series without worrying about the voltage of the combined cells.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
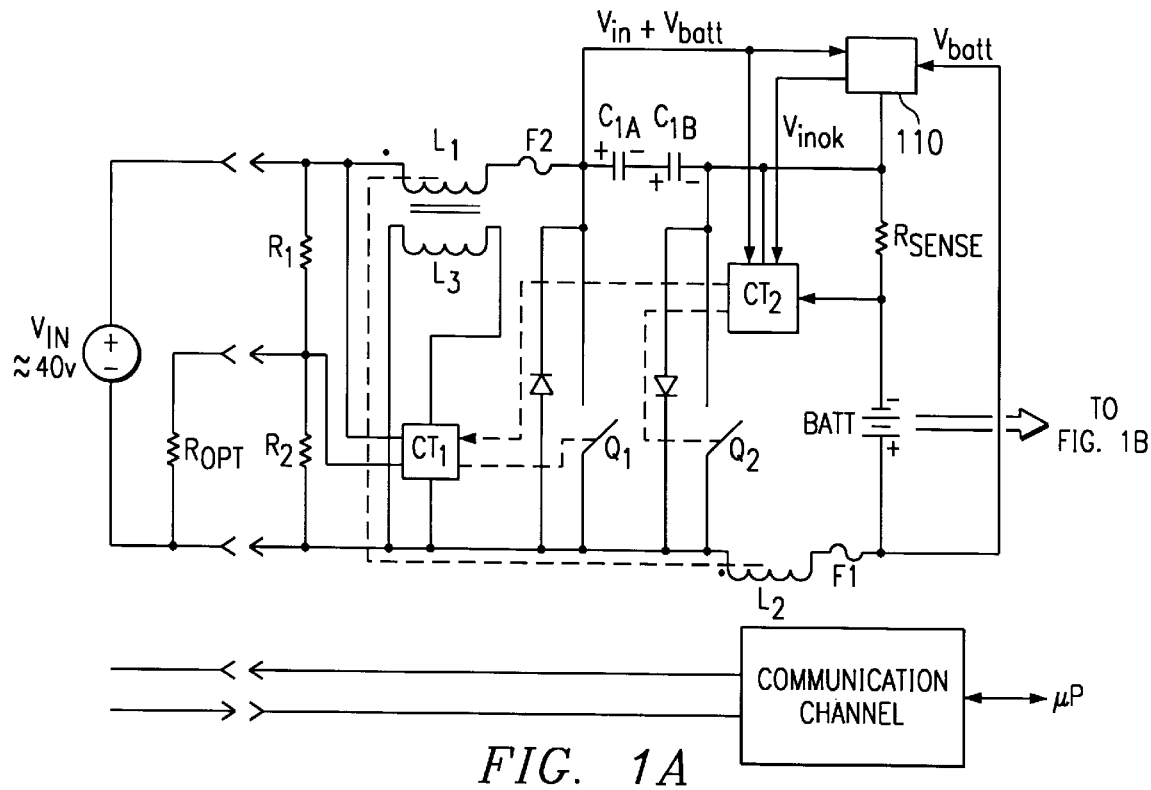
FIGS. 1A and 1B are two parts of a single figure, showing a sample battery controller board architecture of a sample innovative embodiment.
Figure 1B:
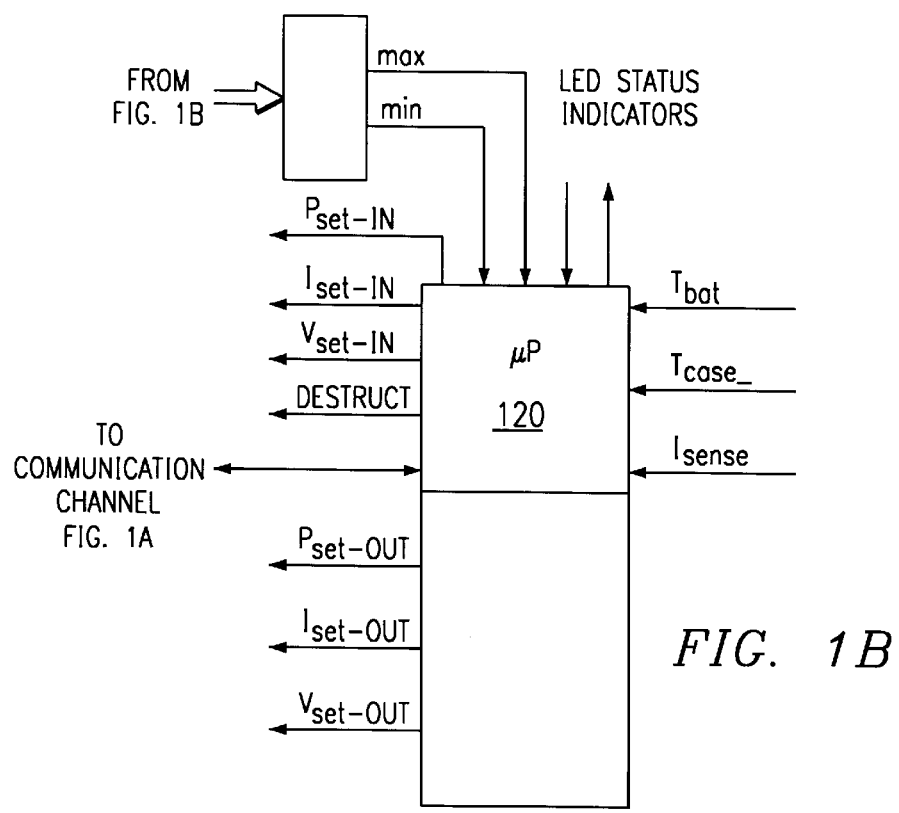

The numerous innovative teachings of the present application will be described with particular reference to the presently preferred embodiment (by way of example, and not of limitation), in which:

FIGS. 1A and 1B are two parts of a single figure, showing a sample battery controller board architecture. The particular topology shown provides ripple cancellation, but of course a variety of other topologies can be used instead.

Note that a polarity inversion occurs in the converter circuitry: the battery BATT is shown with its negative terminal uppermost.

The input connection to the positive side of voltage supply Vin is connected to the dotted end of inductor L1. The undotted end of inductor L1 is connected, through fuse F2, to the capacitor pair C1A/C1B. (This series-connected pair of capacitors is used for safety, since both capacitors would have to break down to create a DC pathway from the battery to Vin.) These are preferably polarized capacitors, and the undotted end of inductor L1 is preferably connected, through fuse F2, to the positive side of capacitor C1A.

The negative side of capacitor C1B is connected, through current-sensing resistor $R_{sense}$, to the negative terminal of the battery BATT. The positive terminal of the battery is connected, through fuse F1, to the undotted end of inductor L2. (Inductors L1 and L2 are coupled together, which reduces the total inductor mass, and also helps with ripple suppression as described below.) Inductors L1 and L2 preferably have equal values in this embodiment.

Switch Q1 is preferably a VDMOS power transistor, and when turned on will sink current from the undotted end of L1 to the negative side of Vin. The body diode of this transistor is also shown.

Switch Q2 too is preferably a VDMOS power transistor, and when turned on will sink current from the dotted end of L2 to the negative side of the battery. The body diode of this transistor is also shown.

Control circuit $CT_1$ controls switch Q1, and receives power from winding L3 which is inductively coupled to inductor L1. Control circuit $CT_1$ also receives a feedback voltage, from the voltage divider R1/R2/Ropt. Since the external resistor Ropt is connected as part of the voltage divider, its value will affect the value of the voltage ratio of this divider, and thus Ropt can change the voltage divider ratio into the error amplifier. This causes the regulated output voltage to shift, depending on the value of the external option resistor Ropt.

Control circuit $CT_2$ controls switch Q2, and receives a current-sensing input from sense resistor $R_{sense}$. The two control circuits $CT_1$ and $CT_2$ are synchronized, and indeed they do not have to be strictly separate. In normal operation, $CT_2$ provides a synchronous control signal to $CT_1$, so that $CT_1$ is slaved to $CT_2$.

Circuit 110 is a Vin testing circuit, which is more fully illustrated in FIG. 1C, and provides a signal to inhibit operation if Vin and the battery voltage are both below limits.

FIG. 1B shows the connections of the microprocessor 120. The sense inputs include battery temperature Tbat, case temperature Tcase, and a current-sensing input Isense. The outputs $P_{set-IN}$, $I_{set-IN}$, $V_{set-IN}$, $P_{set-OUT}$, $I_{set-OUT}$, and $V_{set-OUT}$ provide setpoint signals to the real-time control loops which operate the converter. Specifically, output $P_{set-IN}$ determines the maximum-power setting under charging conditions, output $I_{set-IN}$ determines the maximum-current setting under charging conditions, output $V_{set-IN}$ determines the voltage setting under charging conditions, output $P_{set-OUT}$ determines the maximum-power setting under discharging conditions, output $I_{set-OUT}$ determines the maximum-current setting under discharging conditions, and output $V_{set-OUT}$ determines the voltage setting under discharging conditions. Communications between the system microprocessor and the innovative battery module microcontroller is by way of a communications channel circuit COMM CHANNEL.

Figure 1C:
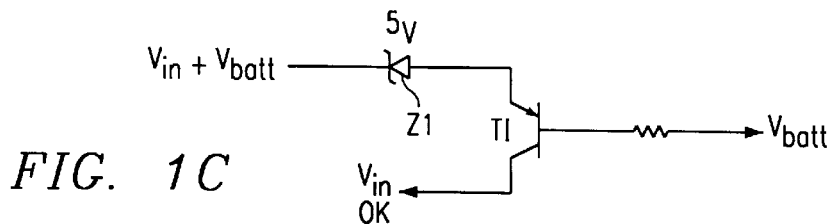
FIG. 1C shows a sample implementation of the Vin test circuitry in FIG. 1A.

FIG. 1C shows a very simple implementation of the Vin testing circuit 110. Zener Z1, in the presently preferred embodiment, provides a drop of 5 V on the emitter of transistor T1. (The total drop is increased by one diode drop, and thus equals about 5.8 V.) As shown in FIG. 1A, the capacitor (pair) C1A+C1B has an average voltage drop of Vin+Vbatt, so if Vin is not up to Vz+Vbe then the enable signal VinOK will not be active, and power will not be drawn from the external supply. (Of course, other circuit configurations can be used to change this voltage threshold.)

Figure 3:
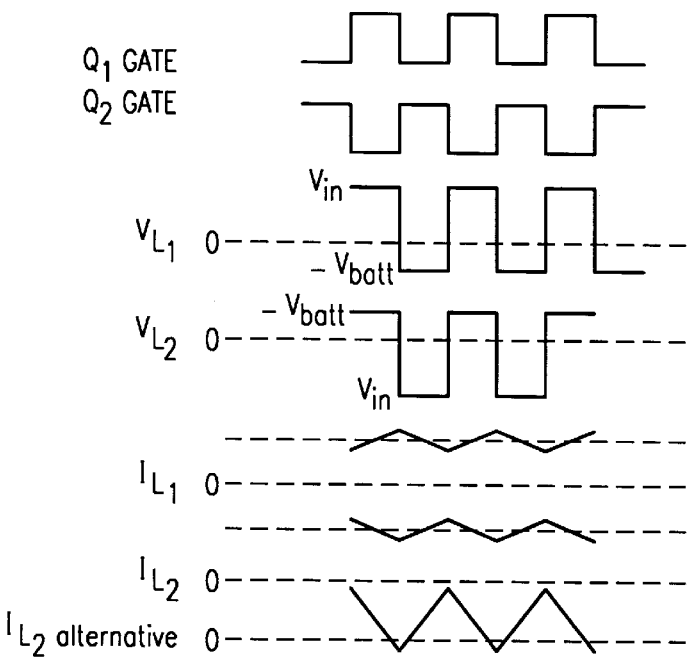
FIG. 3 shows waveforms during operation of the circuit of FIGS. 1A–1B.

FIG. 3 shows waveforms during operation of the circuit of FIGS. 1A–1B. The example shown is continuous operation, but of course discontinuous operation can also be used. As the top two lines of this Figure show, the gates of Q1 and Q2 are switched in opposition. When Q1 turns off (and Q2 turns on), the voltage on inductor L1 drops from Vin to −Vbatt, and the voltage on inductor L2 rises from −Vbatt to Vin. At this time the current $I_{L1}$ on inductor L1 begins to ramp down, and the current $I_{L2}$ on inductor L2 begins to ramp up. In the example shown by the solid trace, the current $I_{L1}$ varies around an average value of Pin over Vin, and the current $I_{L2}$ varies around an average value of Pbatt over Vbatt. (Pin and Pbatt represent the power flow at the external terminals and the electrochemical cells respectively, and will be equal apart from losses.) The bottom trace of FIG. 3 shows an alternative embodiment, in which $I_{L2}$ goes negative for a brief part of each cycle. This negative excursion can be used to recover energy stored on the switch capacitance, and thus provide zero-voltage switching.

It should be noted that this converter topology simply maintains a certain voltage ratio between the input and output terminals, regardless of the direction of power flow. (The control loop refines and stabilizes the precision and transient response, and allows current control and regulation.)

In the top two lines of FIG. 3, the duty cycles of Q1 and Q2 are approximately equal. However, by shifting the duty cycles, the voltage conversion ratio can be changed. The duty cycles for a given voltage ratio result from the condition that volt-seconds must balance: Q1's on-time ($T_{Q1on}$) times Vin will be equal to Q2's on-time ($T_{Q2on}$) times Vbatt.

$$\frac{V_{in}}{V_{batt}} = \frac{T_{Q2on}}{T_{Q1on}}$$

Thus to increase Vin, we increase Q2's on-time and reduce Q1's on-time.

In FIG. 3, it can also be seen that the AC component of the current on L2 is larger than the AC component of the current on L1. This shows asymmetrical ripple-steering, with a larger ripple reduction on L1 than on L2. By adjusting the coupling between the two inductors, the current ripple on L1 can be reduced to zero. In this case $I_{L1}$ will be a constant, as shown by the dashed lines in the $I_{L1}$ trace. (The voltage on $I_{L1}$ will still have an AC component, but the current will not.) In this case the ripple seen by the battery (on L2) would be increased, but in many cases, as discussed above, current ripple seen by the battery is less harmful than current ripple seen by the system. (Alternatively, the inductive coupling can be adjusted to steer the ripple onto L1 instead of L2, but this is less preferable.)

Figure 2:
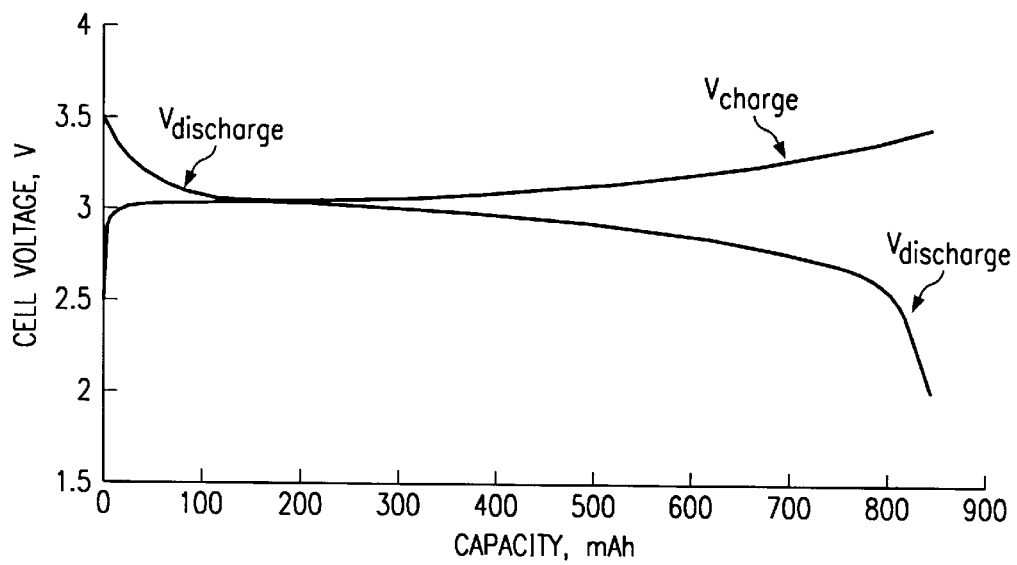
FIG. 2 shows an example of battery charge and discharge curves.

FIG. 2 shows an example of battery charge and discharge voltage curves. This specific example is taken from a AA-size Li/MnO$_2$ rechargeable battery of 850 mAh charge capacity, but is shown merely to illustrate general principles of charge/discharge management. Use of a larger or smaller cell size will change the horizontal scale of the curve, and use of multiple cells in series will change the vertical scale of the curve. Moreover, use of a different cell technology will change the shape of the curve.

A key point to observe about these curves is that they are not flat. (Discharge curves for other rechargeable battery technologies can be even less flat.) Note that the discharge voltage $V_{discharge}$ declines sharply from its initial value of about 3.4 V, and reaches about 3 V after about 150 mAh of discharge (18% of charge capacity). Thereafter the discharge voltage declines steadily until it reaches about 2.75 V after about 650 mAh (76%) of discharge, and about 2.5 V after about 800 mAh (94%) of discharge.

Currently, most complex electronic systems use a high-efficiency DC-DC converter to efficiently exploit the energy of the electrochemical cell despite the voltage changes during discharge. However, some of the simpler appliances which the disclosed universal battery can optionally power do not include such converters. Thus in such applications the universal battery can significantly improve the energy available from a given electrochemical cell. Even in systems which do include DC-DC converters, the regulated voltage of the universal battery permit the converters to be optimized for a single input voltage.

Note that the charging curve $V_{charge}$ is also not flat. Optimally efficient charging is usually less important than optimally efficient discharging, but the present invention permits charging too to be fully optimized if desired. This capability can be used to implement a variety of complex procedures for optimal charging.

Figure 4:
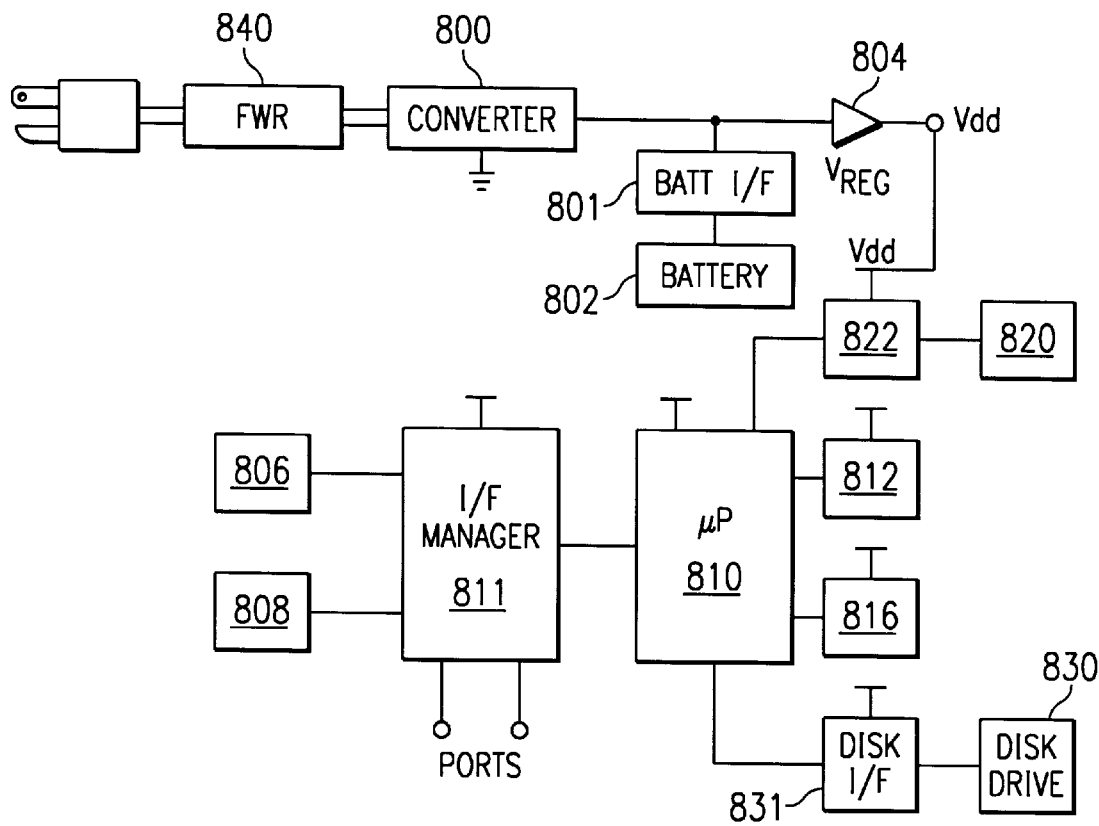
FIG. 4 shows a sample computer system incorporating the innovative architecture of FIG. 1.

FIG. 4 shows a sample computer system incorporating the innovative architecture of FIG. 1. This example is a portable computer system which includes a power converter 800 which is used to charge the battery 802, which contains the integral regulator. Optionally, a battery interface 801 is interposed between the battery and the rest of the circuitry. The power converter is connected, through a full-wave bridge rectifier 840, to draw power from AC mains, and is connected to provide a DC voltage to the battery. The battery 802 (or the converter 800), connected through a voltage regulator 804, is able to power the complete portable computer system, which includes, in this example:

user input devices (e.g. keyboard 806 and mouse 808);

at least one microprocessor 810 which is operatively connected to receive inputs from said input device, through an interface manager chip 811 (which also provides an interface to the various ports);

a memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor.

Optionally, of course, many other components can be included, and this configuration is not definitive by any means.

Figure 5:
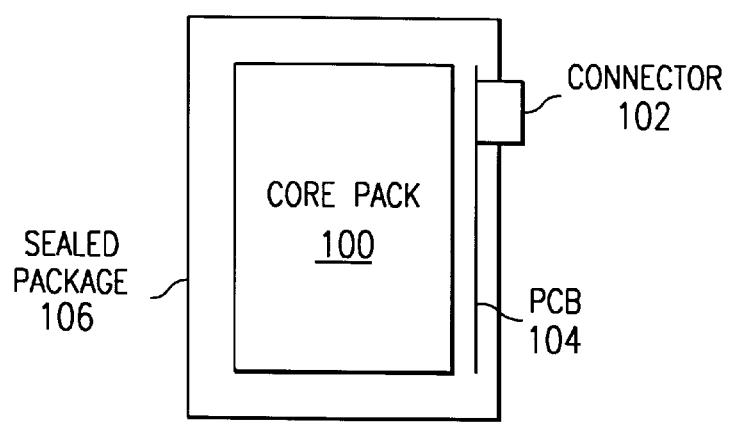
FIG. 5 shows a sample physical configuration of the universal battery module.

FIG. 5 shows a sample physical configuration of the universal battery module. The core pack 100 of electrochemical cells (preferably electrically connected in series, or alternatively in a series-parallel configuration) is mechanically and electrically connected to a small printed circuit board ("PCB") 104. Both the core 100 and the circuit board 104 are enclosed in a sealed package 106. (The sealed package 106, in this example, is not a totally hermetic seal, but is a sufficiently good seal to provide some protection against moisture and dirt.) A connector 102 extends from the board 104 out through the package 106, and provides terminals for connection to a mating connector in the computer system.

According to a disclosed class of innovative embodiments, there is provided: A battery pack subsystem, comprising: one or more battery cells; and a power converter which is connected to selectably increase or decrease the voltage applied to said battery cells during charging, and to selectably decrease or increase the voltage applied to external terminals during discharging; said regulator and said battery cells being packaged together as a single integral unit.

According to another disclosed class of innovative embodiments, there is provided: A battery pack subsystem, comprising: one or more battery cells; and a power converter which is connected to maintain a programmed variable voltage ratio between said cells and external terminals, regardless of whether said cells are being charged or discharged through said external terminals; said power converter and said battery cells being packaged together as a single integral unit.

According to another disclosed class of innovative embodiments, there is provided: A method for operating a portable electronic system, comprising the step of: connecting the power output terminals of a detachable battery module directly to a power bus which powers integrated circuits including programmable logic, with no voltage regulation being performed between said output terminals and said integrated circuits.

According to another disclosed class of innovative embodiments, there is provided: A method for operating a portable electronic system, comprising the steps of: (a.) connecting the power output terminals of a detachable battery module directly to a power bus which powers, at a first voltage, integrated circuits including programmable logic; (b.) transferring power from said power bus to said detachable battery module at a voltage which is greater than said first voltage; wherein no voltage regulation is performed between said output terminals and said electronic components.

According to another disclosed class of innovative embodiments, there is provided: An electronic system, comprising: a power bus which is connected to supply power to one or more electronic components at a first voltage; a power supply which is connected to supply power to said power bus; a rechargeable battery module, including a set of one or more rechargeable electrochemical cells which are connected to achieve a second voltage when fully charged; said second voltage being larger in magnitude than said first voltage; and voltage conversion circuitry which is connected to transfer power from said power bus to said cells at a voltage which is greater than said first voltage.

According to a disclosed class of innovative embodiments, there is provided: An electronic system, comprising: a power bus which is connected to supply power to one or more electronic components at a first voltage; a power supply which is connected to supply power to said power bus; and a rechargeable battery module, including a set of one or more rechargeable electrochemical cells, said module being connected at output terminals to said power bus to achieve a second voltage when fully charged; said second voltage being larger in magnitude than said first voltage; wherein no voltage regulation is performed between said output terminals and said electronic components.

According to another disclosed class of innovative embodiments, there is provided: A computer system, comprising: a computer, comprising memory and a programmable processor, integrated in a common portable chassis; a power bus which is connected to supply power to said programmable processor at a first voltage; a power supply which is connected to supply power to said power bus; a rechargeable battery module, including a set of one or more rechargeable electrochemical cells which are connected to achieve a second voltage when fully charged; said second voltage being larger in magnitude than said first voltage; and voltage conversion circuitry which is connected to transfer power from said power bus to said cells at a voltage which is greater than said first voltage.

According to another disclosed class of innovative embodiments, there is provided: A computer system, comprising: a computer, comprising memory and a programmable processor, integrated in a common portable chassis; a power bus which is connected to supply power to said programmable processor at a first voltage; a power supply which is connected to supply power to said power bus; a rechargeable battery module, including a set of one or more rechargeable electrochemical cells which are connected to achieve a second voltage when fully charged; said second voltage being larger in magnitude than said first voltage; and wherein no voltage regulation is performed between said output terminals and said electronic components.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

The programmability provided by the disclosed architecture permits a vast range of control algorithms to be implemented. For example, the output voltage can be varied, if desired, in accordance with control signals received from an application controller. This capability can be useful, for example, to permit data retention lifetime in sleep mode to be maximized.

For another example, one of the control options is the apparent source impedance of the battery. That is, when the load is drawing maximum current, the voltage of a battery will typically sag somewhat (due to the internal resistance of the battery conduction path, and due to less efficient electrochemical reactions at high current density). The degree to which voltage sags as current increases can be described by a number called "source impedance." One of the options which can be programmed into the universal battery module described above is a programmable source impedance (within limits set by the maximum power output of the battery and the maximum power-handling capability of the converter circuit.

For another example, the converter circuit configuration can be modified to provide multiple isolated outputs at different voltages, if desired.

The integrated converter topology shown is especially advantageous, but is not the only topology which can be used. For example, a simple buck-boost converter topology can also be used. Alternatively and thus preferably, many other converter topologies can also be used, as detailed in the books cited below.

Preferably the converter topology is fully bidirectional, so that the battery voltage can be above or below the system voltage; but this is not strictly necessary.

Operation of the battery at a high voltage increases the required ratings on the switching transistor, and increases the potential loss on the transistors. However, if the converter's topology is chosen so that the switching transistors operate with zero voltage switching (or close to it), this source of inefficiency can be reduced or nearly eliminated.

Alternatively, if the battery cell configuration is chosen to operate at lower voltage (and hence higher current for a given output power), resistive losses will increase, and these are not as easy to reduce. A further disadvantage with operating in the high-current regime is that, even if the switching transistors are made very large to reduce resistive losses due to $R_{dS-oN}$, heat sinking may still be necessary at some level of current, and heat sinking is difficult to do in a battery module.

A further advantage of the high voltage configuration is that the individual cell voltages can more easily be monitored. It is common in lithium-ion cell batteries to monitor voltages at the individual nodes in a serious connection. However, where cells are connected in a series-parallel configuration, there is no way to distinguish between the cell voltages of the parallel-connected cells.

For another example, the converter topology can alternatively be configured for boost-in, buck-out. For a given total energy this permits use of a purely series-connected stack of cells, if desired. This avoids the problems of reverse-biased cells, which can occasionally occur with series-parallel batteries under worst-case conditions.

For another example, for ultrasonic transducer applications a modified circuit configuration can be used to provide ultrasonic drive power directly from the battery module if desired.

For another example, for communications applications a modified circuit configuration can even be used to provide an RF signal output from the battery module (at VLF or higher frequencies) if desired. Optionally, this RF output can be modulated by an external control signal if desired.

For another example, a modified circuit configuration can even be used to provide an AC power output from the battery module if desired.

For another example, a very-low-power wireless data link can optionally be used to provide some communication between the battery module and the application or system.

The following background publications provide additional detail regarding possible implementations of the disclosed embodiments, and of modifications and variations thereof. See generally Pressman, SWITCHING POWER SUPPLY DESIGN (1991); the 3 volumes of Middlebrook and Cuk, ADVANCES IN SWITCHED-MODE POWER CONVERSION (2.ed. 1983); and all of the biennial UNITRODE POWER SUPPLY DESIGN SEMINAR HANDBOOKS; all of which are hereby incorporated by reference.

In a further alternative embodiment, the system voltage can be reprogrammed by sending appropriate commands through the communications interface (possibly a wireless interface) to the controller in the universal battery module.

In one contemplated alternative embodiment, the universal battery module can be modified to include an AC adapter. This would require inclusion of an AC connector, a full-wave rectifier, and preferably also a surge suppressor of some sort, and possibly also a filter. It would also be necessary to use switching devices with high enough voltage ratings to handle the power line voltages reliably, but the premium for this voltage capability is steadily declining. The use of transistors with higher standoff voltage ratings normally implies that the series resistances will also be higher (for a given transistor size). Thus added heat sinking may be necessary in this embodiment.

What is claimed is:

1. A battery pack subsystem, comprising:
   one or more battery cells; and
   a power converter which is connected to selectably increase or decrease the voltage applied to said battery cells during charging, and to selectably decrease or increase the voltage applied to external terminals during discharging;
   said converter and said battery cells being packaged together as a single integral unit.

2. The battery pack subsystem of claim 1, wherein said power converter is a switch-mode power converter.

3. The battery pack subsystem of claim 1, wherein said power converter is controlled to maintain a predetermined voltage ratio.

4. The battery pack subsystem of claim 1, wherein said power converter is controlled to maintain a predetermined current ratio.

5. The battery pack subsystem of claim 1, wherein said power converter is controlled to maintain a predetermined transfer power.

6. A battery pack subsystem, comprising:
   one or more battery cells; and
   a power converter which is connected to maintain a programmed variable voltage ratio between said cells and external terminals, regardless of whether said cells are being charged or discharged through said external terminals;
   said power converter and said battery cells being packaged together as a single integral unit.

7. The battery pack subsystem of claim 6, wherein said power converter is a switch-mode power converter.

8. The battery pack subsystem of claim 6, wherein said power converter is controlled to maintain a predetermined voltage ratio.

9. The battery pack subsystem of claim 6, wherein said power converter is controlled to maintain a predetermined current ratio.

10. The battery pack subsystem of claim 6, wherein said power converter is controlled to maintain a predetermined transfer power.

11. A method for operating a portable electronic system, comprising the step of: connecting the power output terminals of a detachable battery module directly to a power bus which powers integrated circuits including programmable logic, with voltage regulation being performed on the battery side of said output terminals.

12. A method for operating a portable electronic system, comprising the steps of:
   (a.) connecting the power input/output terminals of a detachable battery module directly to a power bus which powers, at a first voltage, integrated circuits including programmable logic;
   (b.) transferring power from said power bus to said detachable battery module at a voltage which is greater than said first voltage;
   wherein any voltage regulation is performed on the battery side of said input/output terminals.

13. An electronic system, comprising:
   a power bus which is connected to supply power to one or more electronic components at a first voltage;
   a power supply which is connected to supply power to said power bus;
   a rechargeable battery module, including a set of one or more rechargeable electrochemical cells which are connected to achieve a second voltage when fully charged; said second voltage being larger in magnitude than said first voltage; and
   voltage conversion circuitry which is connected to transfer power from said power bus to said cells at a voltage which is greater than said first voltage.

14. The electronic system of claim 13, wherein said voltage conversion circuitry is a switch-mode power converter.

15. The electronic system of claim 13, wherein said voltage conversion circuitry is controlled to maintain a predetermined voltage ratio.

16. The electronic system of claim 13, wherein said voltage conversion circuitry is controlled to maintain a predetermined current ratio.

17. The electronic system of claim 13, wherein said voltage conversion circuitry is controlled to maintain a predetermined transfer power.

18. An electronic system, comprising:
   a power bus which is connected to supply power to one or more electronic components at a first voltage;
   a power supply which is connected to supply power to said power bus; and
   a rechargeable battery module, including a set of one or more rechargeable electrochemical cells, said module being connected at input/output terminals to said power bus to achieve a second voltage when fully charged; said second voltage being larger in magnitude than said first voltage;

wherein voltage regulation is performed on the battery side of said input/output terminals.

19. A computer system, comprising:

a computer, comprising memory and a programmable processor, integrated in a common portable chassis;

a power bus which is connected to supply power to said programmable processor at a first voltage;

a power supply which is connected to supply power to said power bus;

a rechargeable battery module, including a set of one or more rechargeable electrochemical cells which are connected to achieve a second voltage when fully charged; said second voltage being larger in magnitude than said first voltage; and voltage conversion circuitry which is connected to transfer power from said power bus to said cells at a voltage which is greater than said first voltage.

20. The computer system of claim 19, wherein said voltage conversion circuitry is a switch-mode power converter.

21. The computer system of claim 19, wherein said voltage conversion circuitry is controlled to maintain a predetermined voltage ratio.

22. The computer system of claim 19, wherein said voltage conversion circuitry is controlled to maintain a predetermined current ratio.

23. The computer system of claim 19, wherein said voltage conversion circuitry is controlled to maintain a predetermined transfer power.

24. A computer system, comprising:

a computer, comprising memory and a programmable processor, integrated in a common portable chassis;

a power bus which is connected to supply power to said programmable processor at a first voltage;

a power supply which is connected to supply power to said power bus;

a rechargeable battery module, including a set of one or more rechargeable electrochemical cells which are connected at input/output terminals to achieve a second voltage when fully charged; said second voltage being larger in magnitude than said first voltage; and wherein voltage regulation is performed on the battery side of said input/output terminals.

* * * * *